United States Patent Office 3,817,923
Patented June 18, 1974

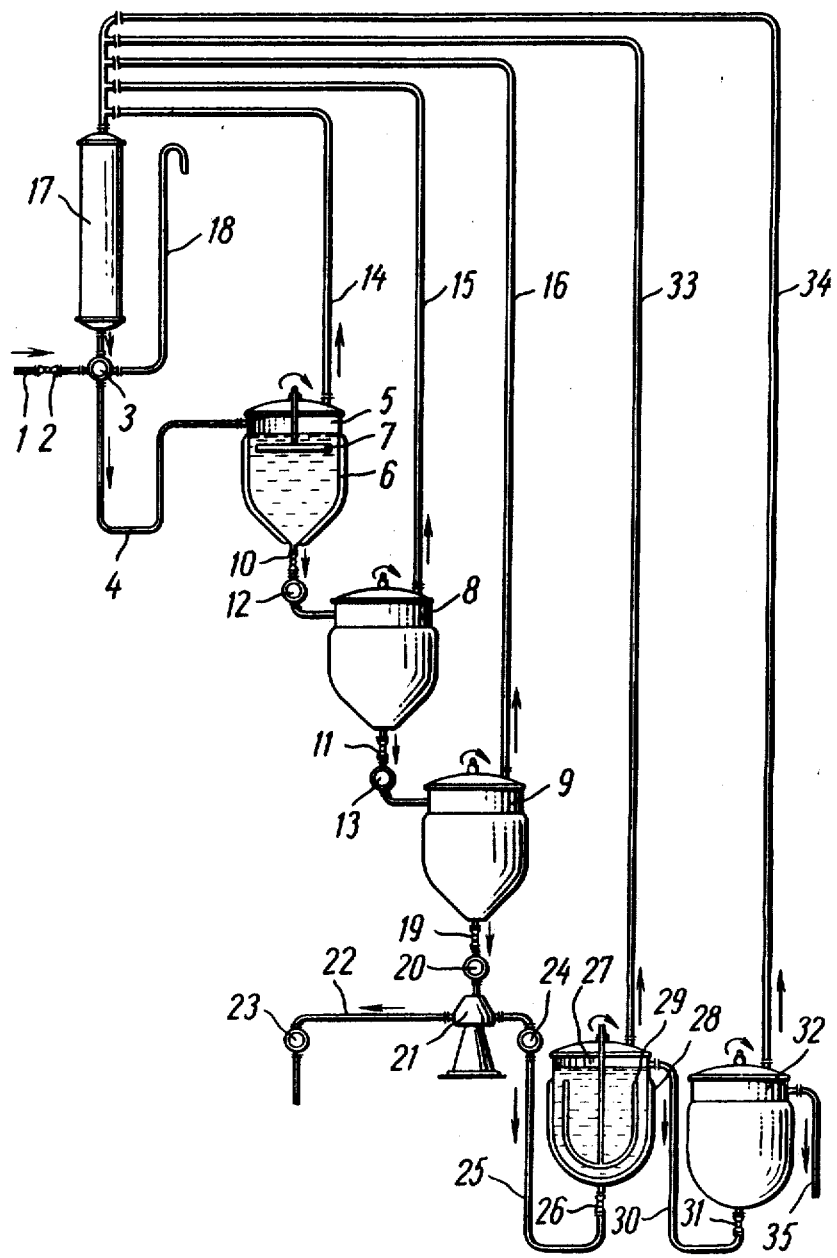

3,817,923
CONTINUOUS PHENOL-ALDEHYDE,
POLYCONDENSATION PROCESS
Petr Sergeevich Ivanov and Vladimir Mikhailovich
Demkin, both of Moscow, U.S.S.R.
Continuation of application Ser. No. 40,822, May 27, 1970, which is a continuation-in-part of abandoned application Ser. No. 494, Jan. 2, 1970, which is a continuation of abandoned application Ser. No. 755,005, Aug. 27, 1968, which in turn is a continuation of abandoned application Ser. No. 412,409, Nov. 19, 1964. This application June 5, 1972, Ser. No. 259,901
Int. Cl. C08g 5/06
U.S. Cl. 260—57 C
6 Claims

ABSTRACT OF THE DISCLOSURE

The process is intended for manufacturing phenol resins. The reaction between phenol and aldehyde is carried out in an aqueous solution wherein primary resinous reaction products are persent in a dispersed phase. The time of residence of said resinous products in the reaction vessel does not exceed substantially the time required for their sedimentation from the solution. The removal of the resinous products practically as they form makes it possible to intensify the reaction without substantially increasing the degree of polycondensation of said products. The conversion of the primary resinous products to resin with a required degree of polycondensation is effected after the separation of said products from the aqueous solution by maintaining it at an elevated temperature, which provides for an accurate control of the degree of polycondensation of the resin, and contributes to the obtaining of the resin of a homogeneous composition.

---

This application is a continuation of co-pending application Ser. No. 40,822 filed May 27, 1970 now abandoned. The latter application was a continuation-in-part of Ser. No. 494 filed Jan. 2, 1970 now abandoned which in turn is a continuation of application Ser. No. 755,005 filed Aug. 23, 1968 now abandoned which in turn is a continuation of application Ser. No. 412,409 filed Nov. 19, 1964 now abandoned.

DETAILED DESCRIPTION (1) The present invention relates to the production of phenol-aldehyde resins, and more specifically represent an improved continuous process of phenol-aldehyde polycondensation.

(2) As is known, polycondensation of phenol with aldehyde is a complicated system of successive and parallel processes of interaction between the reactants. In the entire variety of these processes two processes prove to be most important for the commercial production of the resin namely, binding of phenol and aldehyde with the formation of primary resinous products, and conversion of said primary products to resin due to the reaction of growth of the polymer chain. The first of the said processes is essentially responsible for the degree of conversion of the starting reactants, that is, for the completeness of utilization of raw materials; therefore, it has a substantial influence on the cost price of the resin. Hence, it is obvious, that said first process is desirable to be carried out in such a manner that the degree of conversion of the reactants be maximum. The second of the said processes is responsible for the degree of polycondensation and for the polymer-homologous composition of the resin, and, hence, for the quality of the resultant product.

In this connection, the said second process should be carried out in such a way, that the resin obtained should feature a required degree of polycondensation, it being also desirable that maximum similarity of the resin molecules be attained.

A common feature characteristic for both batch and continuous methods of polycondensation in tubular reactors (U.S. Pat. No. 1,660,403 to Terkington), in mixing reactors comprising one vessel (U.S. Pat. No. 2,688,606 to Schmitt et al.) or a plurality of series-connected vessels (U.S. Pats. Nos. 2,616,872 and 2,663,699 to Bloem et al.) and also for a method of "selective" polycondensation (U.S. Pat. No. 2,750,354 to Merriam) is that both said processes are carried out simultaneously in the same reaction zone. As consequence, the both said processes take place under essentially the same reaction conditions. However, the optimum conditions for carrying out each of said processes are essentially different and, to a certain extent, mutually exclusive.

In deed, for attaining maximum degree of conversion of the reactants, it is obviously reasonable to use such conditions which intensify the reactions of binding said reactants with the formation of resin-forming polycondensation products, that is, an increase of the temperature in the reactor, an increase of the concentration of the catalyst in the reaction mass, etc.

These intensifying conditions, however, simultaneously stimulate an increase in the rate of the reactions of the growth of the polymer chain, whereby the degree of polycondensation of the resin increases.

As a result, within the framework of the above-mentioned methods of polycondensation, the possibility of intensifying the reaction for increasing the degree of conversion of the reactants or for decreasing the volume of the reaction zone with a view to cutting down specific capital investments proves to be rather limited, since any considerable intensification leads to the obtaining of resin with an inadmissibly high degree of polycondensation, or even to gelatinization of the resin directly in the reactor.

On the contrary, sufficiently moderate conditions of carrying out the reaction make possible an accurate control of the degree of polycondensation and, moreover, contribute to the obtaining of the resin of a more homogeneous composition.

Thus, when carrying out polycondensation according to any of the known methods, a problem inevitably arises, which of said processes is to be preferred, since carrying out of the reaction under sufficiently mild conditions is associated with an increase in the losses of raw materials or at least with a considerable decrease in the throughput of the equipment, while the performance of the reaction under intensifying conditions makes more difficult the control of the degree of polycondensation of the resin, which increases the danger of obtaining the resin with a degree of polycondensation lying outside the prescribed limits, or even gelatinization of the resin in the reactor.

In the industrial practice the conditions adopted for carrying out the reaction are, as a rule, those of a compromise, and, to a certain extent, differ from those optimal for both of the above-said processes, or, in any case, for one of them.

An object of the present invention is to provide an intensified process of phenol-aldehyde polycondensation, which makes possible to considerably increase the degree of conversion of the starting reactants as compared to the processes known heretofore.

Another object of the invention is the provision of an intensified process of polycondensation, which allows a reduction in the specific volume of the reactor.

A further object of the invention is the provision of a process of polycondensation, which ensures the obtaining of resins with a homogeneous polymer-homologous composition.

The present invention also provides a possibility for producing resins with the use of diluted solutions featuring low concentrations of phenol and aldehyde.

Other objects and advantages of the present invention will become more fully apparent from the following description and the appended diagrammatic flow sheet.

In accordance with the present invention, it is proposed that the process of binding phenol and aldehyde with the formation of primary resinous products should be spatially isolated from the process of conversion of said primary products to a resin with a prescribed degree of polycondensation, so that the first of said processes should take place and terminate in one reaction zone, and the second of said processes should take place, mainly, and terminate in another, subsequent reaction zone. Such separation of the said processes in space provides a possibility for each of these processes to be carried out under optimal conditions.

The process of polycondensation, according to the present invention, comprises the following sequence of operations.

Phenol, aldehyde and reaction catalyst are continuously introduced into a reaction zone which is a vessel filled with an aqueous solution containing said phenol, aldehyde and catalyst.

The amount of said starting materials incoming into the vessel per unit of time is so adjusted, that as a result of the reaction there should form resinous products insoluble in the aqueous solution filling the reactor. The incoming materials are mixed with the contents of the vessel with such an intensity of mixing, that the continuously forming resinous products whose specific gravity is greater than the specific gravity of the solution which fills the vessel could freely precipitate into the bottom part of said vessel. The aqueous solution together with said resinous products is removed from the bottom part of the vessel in such an amount per unit of time, that the level of liquid in the vessel should remain substantially the same. The resinous products removed from the vessel are separated from said aqueous solution and kept in a subsequent reaction zone at an elevated temperature over a period of time sufficient for their conversion to a resin with a preset degree of polycondensation.

The preferred embodiment of the invention comprises the following sequence of operations.

Phenol, aldehyde and reaction catalyst are continuously introduced into the first reaction vessel of a plurality of reaction vessels comprising at least two consecutively connected vessels, each of which is filled with an aqueous solution containing said phenol, aldehyde and catalyst. The amount of said starting materials incoming into said first vessel per unit of time is so adjusted, that already in the said first vessel there should form resinous products of polycondensation which are insoluble in the aqueous solution filling said vessel. The materials incoming into said first reaction vessel are mixed with the contents of the vessel with such an intensity of mixing, that the continuously forming resinous products whose specific gravity exceeds that of the solution which fills the vessel could be essentially freely precipitate into the bottom part of said first reaction vessel. The aqueous solution together with said resinous products is removed from the bottom part of said first vessel at such a rate, that the level of liquid in said vessel should remain essentially constant.

Into each subsequent vessel comprised in the above-mentioned plurality liquid is introduced that has been removed from the preceding vessel of the said plurality. In each subsequent vessel of said plurality the operations of mixing the incoming liquid with the contents of the vessel, and of the removal of the aqueous solution of the reactants together with the resinous products of polycondensation from the bottom part of the vessel are repeated, said operations in the subsequent vessels being effected in the same manner as in the said first vessel. The resinous products of polycondensation removed from the last vessel comprised in the said plurality are separated from the aqueous solution removed together therewith and kept at an elevated temperature over a period of time sufficient for their convertion to a resin with a preset degree of polycondensation.

One of the methods of carrying out the process of phenolaldehyde polycondensation in accordance with the present invention is illustrated by the appended diagrammatic flow sheet.

The invention can be used for obtaining resins intended for the manufacture of moulding compositions, laminated plastics, adhesives, abrasives, etc.

The present invention makes it possible to manufacture both thermoplastic (novolac) and thermoreactive (resol) resins. To effect the polycondensation reaction, as phenolic reactants there may be used monohydroxybenzene, isomers of cresol or of xylenol, dihydroxy phenols and various combinations of said substances, including a mixture of homologues of phenol, known in the art as tar acids. As aldehyde reactants use may be made of formaldehyde conventionally utilized as an aqueous solution, various solid polymers of formaldehyde, such as paraformaldehyde as well as acetaldehyde, furfural and hexamethylenetetramine. As a catalyst for the polycondensation reaction use may be made of sulphuric acid, hydrochloric acid, oxalic acid, phenol-sulphonic acid, as well as sodium hydroxide, ammonium hydroxide, and a number of other acids, bases and salts.

Phenol, aldehyde and catalyst can be charged into the reactor separately. It is also possible, that some of these substances or all of them be fed into the reactor as a mixture.

Any of the above-said substances can be used as solutions. Besides, use can also be made of diluted solutions containing said substances, such as, for example, waste water of the phenol-aldehyde resin manufacture.

Described hereinbelow is the continuous process of phenol-aldehyde polycondensation as illustrated in the appended diagram.

A preliminarily prepared mixture of phenol, aldehyde and reaction catalyst, taken at a fixed ratio, is continuously fed at a given rate through a pipepline 1, provided with a valve 2, into a look box 3.

From the look box 3 the starting materials flow by gravity through a pipeline 4 into a reaction vessel 5 with a conical bottom. The vessel 5 is provided with a jacket 6 into which a heat carrier such as steam is introduced for heating the reaction mass during the starting period and for maintaining a temperature in the vessel 5, required for carrying out the polycondensation reaction.

Usually this reaction is carried out an an elevated temperature. However, at a sufficiently high concentration of the catalyst in the reaction mass, the polycondensation can proceed at normal and even at a reduced temperature. In such a case the function of the heat-carrier introduced into the jacket 6 will be, evidently, to remove exothermic heat of the polycondensation reaction.

The vessel 5 is provided with a stirrer 7 serving for a uniform distribution of the continuously fed starting materials in the contents of the vessel 5.

The reaction of polycondensation of phenol with aldehyde is known to be homophase only during the initial stages. Further a reduction in the solutbility of the resulting resinous reaction products in the reaction mass due to a reduction of the concentration of phenol therein leads to the separation of the mass into two phases, after which the reaction becomes heterophase. One of the phases is an aqueous solution of the initial reactants and the catalyst, since water is formed in the course of the reaction and, besides, may be introduced into the reactor with the starting materials; the other phase is constituted by the resinous products of polycondensation which are insoluble in said aqueous solution.

For carrying the present invention into effect, it is necessary, that the process of polycondensation which proceeds in the vessel 5 should correspond to the heterophase stage of the reaction. In other words, it is necessary, that with the fixed ratio of phenol, aldehyde and catalyst, as well as temperature, the amount of materials incoming into the vessel 5 per unit of time should be such as to ensure the formation in the vessel 5 of resinous products of polycondensation, insoluble in the aqueous solution of the reactants. Since the specific gravity of the resulting resinous products exceeds the specific gravity of the aqueous solution of the reactants, said products will tend to precipitate from the solution. For the realization of the present invention it is very important also that the mixing of the contents of the vessel 5 by means of the stirrer 7 should not interfere essentially with the precipitation of the continuously forming resinous products to the bottom part of the vessel. Most suitable for this purpose are paddle stirrers rotating at a rate of 30–50 r.p.m. Nevertheless, mixing of the reaction mass caused by its boiling is also admissible. From the bottom part of the vessel 5, the reaction mass, that is, the aqueous solution together with the resinous products, is continuously removed at a space velocity equal to the rate of charging of the starting materials. It should be noted, that under the described conditions no bottom layer of resinous products can form in the vessel 5. Indeed, the volume of resinous products forming in the vessel 5 during a given period of time is naturally smaller than the volume of the starting materials incoming to the vessel during the same period of time. Since from the bottom part of the vessel 5, whereto the resinous products precipitate, during the same period of time a volume of liquid is removed equal to the volume of the starting materials charged, resinous products cannot remain in the vessel in the form of a layer, since these products are continuously removed from the bottom part of the vessel, as they form, together with the aqueous solution of the reactants. Therefore, under stabilized conditions of operation, the aqueous solution of the reactants is found in the vessel as a continuous phase, whereas the resinous products are present in said vessel only as a dispersed sedimenting phase. As a result, the residence time of the phases in the vessel 5 is determined by various factors. Thus, the residence time of the aqueous solution is practically equal to the ratio of the volume of the vessel 5 to the space velocity with which this solution is formed in the vessel due to the reaction and also due to a possible introducing of water into the vessel together with the continously incoming starting materials.

The residence time of the resinous products in the vessel 5 does not depend on the residence time of the aqueous solution therein, and is determined by rate of precipitation of particles of said products to the bottom part of the vessel. We have found said precipitation rate to be 0.01–0.1 meter per second. Therefore, the residence time of the resinous products in the reaction vessel whose dimensions are such as usually adopted in industrial practice does not exceed 1–2 min. Due to a short residence time of the resinous products in the vessel 5, for increasing the degree of conversion of the reactants, or for increasing the throughput capacity, intensifying reaction conditions can be maintained in said vessel, the influence of these conditions on the degree of polycondensation of the resinous products removed from the vessel being insignificant.

As can be seen from the above-stated, any degree of conversion of the starting reactants, including a rather high one, can be attained already in the vessel 5. However, when the present invention is used for producing the resin on an industrial scale, this is known to be inexpedient.

For increasing the throughput of the equipment, or for enhancing the degree of conversion of the reactants, it is preferable to employ a plurality of series-connected vessels. Therefore operations similar to those carried out in the vessel 5 are repeated in vessels 8 and 9, that have a design identical to that of the vessel 5. The only difference in the operations is that instead of the mixture of starting materials, which is fed into the reaction vessel 5, the reaction mass is introduced from the preceding vessel into the vessels 8 and 9 through valves 10 and 11 and look boxes 12 and 13, respectively.

In case the polycondensation is carried out at a boiling point of the reaction mass, which fact considerably simplifies the control of the thermal conditions in the vessels, vapours of volatile substances evolving in the vessels 5, 8 and 9 enter via pipelines 14, 15 and 16 a common reflux condenser 17 where they are condensed, and the condensate through the look box 3 and water seal 4 returns to the vessel 5.

For the reaction to be carried out at atmospheric pressure, the look box 3 is made to communicate with the atmosphere by means of a pipeline 18.

It should be point out, that it is also possible to carry out the reaction under pressure to intensify the process by increasing the temperature. It is apparent, that in this case the reaction vessels 5, 8 and 9 should be rated for the adequate pressure. If the reaction is carried out at normal or reduced temperature, there is, naturally, no need in using the reflux condenser 17.

In the vessel 9 the process of interaction of the starting materials is essentially completed. The reaction mass is discharged from the vessel 9 at the same rate as that of feeding the starting materials to the vessel 5, and through a valve 19, and a look box 20 it is taken to a separating centrifuge 21, where the resinous polycondensation products are separated from the aqueous solution.

A Florence flask or a settler operating in a continuous manner may also be used as a separating device. Moreover, water with some amount of unconverted starting materials may be separated from the resinous polycondensation products by evaporation.

From the separating centrifuge 21 the aqueous phase is directed via a pipeline 22 and through a look box 23 into a sewer, or, if necessary, is directed for purification from chemical admixtures.

Through a look box 24, a water seal 25 and a valve 26 the resinous polycondensation products are continuously introduced into the bottom part of a vessel 27. Said vessel 27 is equipped with a steam jacket 28, adapted to maintain a temperature in the vessel, sufficient for the polycondensation reaction to be continued, and with an anchor stirrer 29.

Since in the reaction vessel 27 there take place no processes of precipitation, it is not necessary that said vessel should have a conical bottom. During the residence of the resinous products in the vessel 27 at an elevated temperature, an increase of the degree of polycondensation of the resin takes place. From the upper part of the vessel 27 the resinous products via an overflow pipe 30 through a valve 31 enter a reaction vessel 32, where an operation similar to that carried out in the reaction vessel 27 is effected, both said vessels having an identical construction. The vessels 27 and 32 by means of gas pipelines 33 and 34 are connected with the reflux condenser 17 from which the condensate is returned to the vessel 5. From the vessel 32, through an overflow pipe 35, resin having the desired degree of polycondensation is continuously discharged.

For carrying out the process of conversion of the resinous products to a resin with a prescribed degree of polycondensation, use can be made, naturally, of not only mixing reactors, but also of reactors of other types, such as tubular or periodic action ones.

For a better understanding of the present invention, some examples of carrying out polycondensation of phenol and aldehyde in accordance with the invention are given hereinbelow by way of illustration.

Example 1

A mixture of starting components is preliminarily prepared, which contains technical tricresol, formalin and ammonia, taken in the following ratios:

|  | Kg. |
|---|---|
| 100 percent cresol | 1000 |
| 37 percent formalin | 1000 |
| 25 percent aqueous solution of ammonia | 150 |

This mixture is continuously fed at a rate of 600 kg. per hour into the first reaction vessel of the plant which consists of four such vessels connected in series. The capacity of each vessel is 500 l. Each vessel is equipped with a paddle stirrer rotating at a speed of 28 r.p.m., and with a steam jacket, into which steam is fed under a pressure of 3 atm. All the vessels operate under atmospheric pressure. Due to heating, in all the vessels conditions of mild boiling at a temperature of about 100° C. are maintained. Vapours of volatile substances which evolve in the course of boiling of the reaction mass, enter a reflux condenser common to all the four vessels of the plant, the cooling surface of the condenser being 20 sq. m. Said condenser returns the condensate into the first reaction vessel. The mixture of the starting components is continuously introduced into the upper part of the first vessel.

The reaction mass is continuously withdrawn from the bottommost part of the first reaction vessel. The rate of discharge is controlled by means of a valve adjusted by automatic devices which maintain a constant level of the liquid in the vessel.

The reaction mass discharged from the first vessel is continuously passed through the remaining reaction vessels of the plant, which operate similarly to and have the same design as the first vessel.

The reaction mass issuing from the bottommost part of the fourth (last) reaction vessel is continuously separated in a Florence flask having a capacity of 100 l. into an aqueous and a resinous phase. The aqueous phase which forms at a rate of 74 kg. per hour features a residual content of cresol of 0.9 percent and a residual content of formaldehyde of 1.6 percent, and therefore it is directed for purification from harmful chemical substances.

The liquid resol resin produced at a rate of 526 kg. per hour has a viscosity of 460 cp. at 20° C., water content of 28% and 3.5 percent of unconverted phenol. This resin can be used as a binder in the manufacture of fibrous moulding materials.

Example 2

Starting materials are continuously fed by proportioning pumps from storage tanks for the polycondensation reaction in the following amounts:

|  | Kg. per hour |
|---|---|
| 100 percent phenol | 600 |
| 37 percent formalin | 410 |
| 20 percent sulphuric acid | 90 |

A plant illustrate in the appended diagrammatic flow sheet is used for carrying out the polycondensation process.

Each of the three consecutively connected reaction vessels in which a desired degree of conversion of the starting materials is reached, has a capacity of 500 litres and is equipped with a paddle stirrer rotating at a speed of 28 r.p.m. and with a steam jacket into which steam is introduced under a pressure of 3 atm. In the first of said reactors a temperature of 75–80° C. is maintained automatically, whereas in the subsequent two vessels the reraction is carried out at a temperature of 100° C. All the vessels operate under atmospheric pressure, a constant level of liquid being maintained therein.

For the separation of the phases a separating centrifuge is used, which has a rotor consisting of 50 conical discs whose base diameter is 350 mm. and height is 220 mm. The rotor rotates at a speed of 4500 r.p.m.

Each of the two reaction vessels, in which a desired degree of polycondensation of the resin is attained, has a capacity of 500 litres and is equipped with an anchor stirrer rotating at a speed of 60 r.p.m. and with a steam jacket, into which steam is supplied under a pressure of 3 atm.

The resinous polycondensation products which fill the vessels to the level of their overflow pipes are heated up to 100° C.

All the five reaction vessels of the plant are connected by means of pipelines with a condenser which is common for all the said vessels and has a cooling surface of 20 sq. m.

The aqueous phase produced at a rate of 280 kg. per hour has a residual content of phenol of 1.3% and a residual content of formaldehyde of 0.8%, and is a waste product of the process.

After the separation of the aqueous phase, the resinous polycondensation products which feature 18% of moisture and 4.8% of unconverted phenol, and whose viscosity is 580 cp. at 20° C., are continuously passed at a rate of 820 kg. per hour through two consecutively connected reaction vessels for the viscosity of the resin to be increased up to the specified value. The resin issuing from the last vessel of the plant has a water content of 17.3%, content of unconverted phenol of 4.6%, and a viscosity after Ostwald at 20° C. of 28,600 cp.

This resin, after the evaporation of water, phenol and other volatile substances, and cooling, can be used as a binder for manufacturing abrasives.

Example 3

To the waste water resulting during the manufacture of phenol-formaldehyde resins, which contains 3.2% of phenol and 2.3% of formaldehyde, a 30% hydrochloric acid is added in such amounts, that the pH of the solution should be within 1.2–1.3.

This solution is continuously fed for effecting the polycondensation reaction at a rate of 500 kg. per hour. The same plant and the same conditions are used for carrying out the polycondensation, as in Example 2, the difference being only in that the temperature in all the reaction vessels of the plant is maintained to be 100° C., and only one vessel having a capacity of 50 litres is used for attaining a desired viscosity of the resin.

The aqueous phase produced at a rate of 479 kg. per hour has a residual content of phenol of 0.4%, and a residual content of formaldehyde of 1.3%. The resin issuing from the last reaction vessel of the plant at a rate of 21 kg. per hour has a water content of 22%, a content of phenol of 1.4%, and a viscosity after Ostwald at 20° C. of 36,200 cp.

The resultant resin is a novolac and can be added in small amounts to other novolac resins after the completion of the polycondensation stage and before the commencement of the evaporation stage. This resin can also be used directly for producing moulding powders.

Example 4

In tar acids which contain 72% of phenol (as calculated for monohydroxybenzene), water, as well as small amounts of pyridine bases and other admixtures, caustic soda and barium hydroxide are dissolved in amounts of 3.8 parts by weight and 1 part by weight, respectively, per 100 parts by weight of phenol. This solution, preheated to 90° C., is continuously fed into a tubular reactor composed of "tube-in-tube" type elements, at a rate of 270 kg. per hour. Simultaneously furfural heated to 150° C. is continuously introduced into the tubular reactor at a rate of 160 kg. per hour. The internal diameter of the tubes of said reactor is 50 mm., and the total length of the reaction zone is 60 m. By supplying a heat-carrier into the reactor jackets, the temperature of the reaction mass at the outlet of the reactor is maintained at 150° C. From the tubular reactor the liquid is continuously fed to a vertical autoclave which has a capacity of 100 litres, is equipped with a jacket and a paddle stirrer rotating at a speed of 50 r.p.m. The process of polycondensation in said autoclave is carried out under a pressure that is equilibrium for this temperature and reaches about 5 atm. From the bottom part of the autoclave the reaction mass is continuously withdrawn, the discharge rate thereof being controlled by means of an automatic valve in such a manner, that the autoclave should be filled to 0.8 of its total capacity. The reaction mass removed from the autoclave is continuously fed into one of the two alternately operating reactors, each having a capacity of 1 cu. m., equipped with a jacket and an anchor stirrer which rotates at a speed of 50 r.p.m.

The reactor is connected with a tubular condenser and therethrough it communicates with the atmosphere. The temperature of the reaction mass incoming from the autoclave into the reactor is reduced down to 100° C.

Vapours evolving as a result of throttling are condensed in the condenser, and the condensate thus produced at a rate of 25 kg. per hour, which is essentially water with small amounts of phenol and furfural, is directed to the sewer. After said reactor has been filled to 0.8 of its capacity, the feed of the reaction mass from the autoclave is switched over to another reactor. Then the reactor containing the resinous polycondensation products is charged with 30 kg. of furfural, and the contents of the reactor are kept at a temperature of 100° C. under stirring during a period of about 40 min., till the viscosity of the resin becomes 3000 cp. The condenser in this case operates as a reflux condenser. The resultant 830 kg. of novolac resin feature 19% of water, 1.2% of free phenol and 1.4% of furfural. After evaporation this resin can be used for producing moulding powders.

Though the present invention has been described in connection with preferred embodiments thereof, it is aparent that various changes and modifications can be resorted to without departing from the spirit and scope of the invention, as those skilled in the art will easily understand. Such changes and modifications are to be considered as falling within the true spirit and scope of the invention as defined in the appended claims.

What is claimed is:

1. A process for carrying out phenol-aldehyde polycondensation comprising continuously introducing phenol, aldehyde and a reaction catalyst into a vessel filled with an aqueous solution containing said reagents and catalyst, maintaining the temperature in said vessel at the value sufficient for carrying out polycondensation, holding the aqueous solution of reagents in said vessel for a time sufficient for the formation of resulting resinous polycondensation products which are insoluble in said aqueous solution, the time of holding being a function of the volume of the vessel to the amount of material introduced into the vessel per unit of time, mixing the reagents and catalyst newly entering said vessel with the contents thereof at an intensity of mixing that does not interfere with the precipitation of said resinous polycondensation products to the bottom portion of the vessel, continuously removing a reaction mixture consisting of precipitating resinous polycondensation products together with aqueous solution at such a rate that the level of the liquid in the vessel remains constant and no layer of polycondensation product is formed at the bottom of the vessel, the removal of the polycondensation products and aqueous solution at the bottom of the vessel being the only place at which removal of these components is made from the vessel, separating the reaction mixture removed from the vessel to isolate the resinous polycondensation products from the aqueous solution, and holding said resinous products in a subsequent reaction zone at an elevated temperature sufficient for the continuation of polycondensation.

2. A process as claimed in claim 1 wherein the temperature in the subsequent reaction zone is at least 50° C.

3. A process as claimed in claim 1 wherein the reaction mixture removed from the bottom of the vessel introduced into at least one further series-connected vessel before it is introduced into said subsequent reaction zone, and repeating in said further vessel the operations of mixing and removal of reaction mixture in the same manner as in the first vessel.

4. A process as claimed in claim 3 wherein the temperature in the reaction zone following the last vessel is 50° C.

5. A process as claimed in claim 1 wherein said mixing of the reagents and catalyst newly entering the vessel with the contents thereof is effected by stirring the contents of the vessel near the surface thereof at a rate of rotation of 30–50 f.p.m.

6. A process as claimed in claim 1 wherein the resinous products are precipitated at a rate of about 0.01 to 0.1 meters per second and have a residence time in said vessel less than 2 min.

References Cited

UNITED STATES PATENTS

| | | | |
|---|---|---|---|
| 2,456,192 | 12/1948 | Houlton | 260—57 |
| 2,616,872 | 11/1952 | Bloem et al. | 260—54 |
| 2,658,054 | 11/1953 | Coleman et al. | 260—57 |
| 2,663,699 | 12/1953 | Bloem et al. | 260—54 |
| 2,750,354 | 6/1956 | Merriam | 260—57 |

FOREIGN PATENTS 1,089,936  11/1967  Great Britain.

HOWARD E. SCHAIN, Primary Examiner

U.S. Cl. X.R.

260—29.3, 57 A, 57 R